United States Patent [19]

Kampe

[11] 3,717,556
[45] Feb. 20, 1973

[54] PROCESS FOR THE PREPARATION OF β-HALOGENO-ALKYL-ISOCYANATES

[75] Inventor: Klaus-Dieter Kampe, Frankfurt/Main, Germany

[73] Assignee: Farbwerke Hoechst Aktiengesellschaft vormals Meister, Lucius & Bruning, Frankfurt (Main), Germany

[22] Filed: June 5, 1970

[21] Appl. No.: 43,937

[30] Foreign Application Priority Data

June 14, 1969 Germany.....................P 19 30 329.8

[52] U.S. Cl......204/158 R, 204/158 HE, 204/162 R, 204/162 HE, 260/453 A, 260/453 P, 260/488 F

[51] Int. Cl..........................B01j 1/10, C07c 119/04

[58] Field of Search..204/158 R, 158 HE, 162 R, 162 HE; 260/453 A, 453 AR, 453 AL, 453 P, 488 F

[56] References Cited

UNITED STATES PATENTS 3,401,106 9/1968 Rehovoth et al..................204/162 R
3,437,680 4/1969 Farrissey et al..................260/453 A

*Primary Examiner*—Howard S. Williams
*Attorney*—Curtis, Morris and Safford

[57] ABSTRACT

N-halogeno-alkyl-β-lactams are rearranged into β-halogeno-alkyl-isocyanates by contacting them with unsaturated organic compounds, optionally under irradiation. The products are highly reactive and useful for the synthesis of heterocyclic compounds.

14 Claims, No Drawings

PROCESS FOR THE PREPARATION OF β-HALOGENO-ALKYL-ISOCYANATES

The present invention relates to a process for preparing β-halogeno-alkyl-isocyanates by a rearrangement of N-halogeno-β-lactams in the presence of a C—C unsaturated compound.

Rearrangement reactions of N-halogeno-β-lactams yielding β-halogeno-isocyanates in the presence of C—C unsaturated compounds and of catalytical amounts of substances which disintegrate easily into radicals are already known from Tetrahedron Letters, 1969, pages 117–120. In this case, the starting β-lactam is optionally substituted by radicals which are inert towards the isocyanate group and are linked to the β-lactam ring via a carbon atom.

It has now been found that β-halogeno-alkyl-isocyanates of the general formula

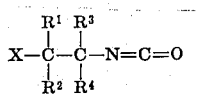

in which X stands for bromine or chlorine, $R^1$ and $R^2$ each stands for hydrogen or halogen or lower alkyl and $R^3$ for hydrogen or lower alkyl, and $R^4$ stands for hydrogen or an aliphatic radical having up to 22 carbon atoms, preferably up to 10 carbon atoms, a cycloaliphatic radical having four to eight, preferably five to eight, carbon atoms, an aromatic radical, lower acyloxy, lower carbalkoxy or, if $R^1$ and/or $R^2$ each stands for halogen, for lower alkoxy, and in which two of the radicals $R^1$, $R^2$, $R^3$ and $R^4$ may form part of a cycloaliphatic or heterocyclic ring or ring system, can be prepared from N-halogeno-β-lactams by contacting N-halogeno-β-lactams of the general formula II

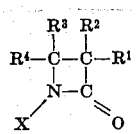

II in which X, $R^1$, $R^2$, $R^3$ and $R^4$ are defined as above, with an olefin and/or an acetylene at temperatures of from −200° to +250° C in the absence of substances which disintegrate easily thermally into radicals under the conditions given above.

According to the invention, the easily reacting brominated compounds are preferably used.

The rearrangement reaction of the N-halogeno-β-lactams is advantageously carried out in the presence of a solvent which is inert towards the isocyanate group. Especially suitable solvents are chloroform, methylene chloride, 1,2-dichloro-ethane, carbon tetrachloride and/or n- and iso-propyl chloride.

Preferred embodiments of the process of the invention are the following: The N-halogeno-β-lactam is mixed with an olefin and/or an acetylene at temperatures above −30° C, especially of from 0° to +150° C, and this mixture is allowed to stand over a period of from several seconds to some hours within the indicated temperature range; or, in order to shorten the reaction time at temperatures below 60° C, N-halogeno-β-lactams of the general formula II are exposed to light of a wave length below 700 nm, preferably of from 240 nm to 590 nm, more particularly of from 300 nm to 590 nm, or to high-energy irradiation at temperatures of from −200° to +250° C, preferably from about −70° to about +100° C, in the presence of an olefin and/or an acetylene, optionally with the use of an inert solvent.

The N-halogeno-β-lactams of the general formula II, used as starting materials, are prepared according to methods known for the N-halogenation of lactams (cf. for example, B. Taub and J. B. Hino, J. Org. Chem. 25 (1960), page 263; G. Caprara et al., Ann. Chimica 49 (1959), page 1167) by halogenation, especially bromination, of the corresponding β-lactams with the equivalent amount of halogen in the presence of a sodium hydrogencarbonate solution or dilute sodium carbonate solution. The so-obtained impure N-halogeno-β-lactams may be used for the rearrangement reaction of the invention.

The process of the invention is applicable to all compounds containing a β-lactam ring and carrying a bromine or chlorine atom at the nitrogen atom of the lactam group, except β-lactams containing in the molecule groups which would react with the isocyanate group formed during the rearrangement, for example hydroxy or amino groups.

To specify the β-lactams suitable for this process, in which two of the above-mentioned radicals $R^1$, $R^2$, $R^3$ and $R^4$ may form part of rings or ring systems, the following β-lactams of the formulas III to VIII may be cited as examples, but they are not intended to limit the β-lactams of this type to be used as starting material thereto.

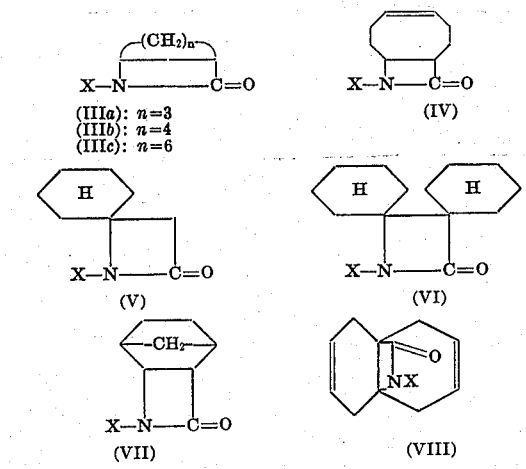

Furthermore, dilactams, e.g. those of the following formulas IX and X, may also be used:

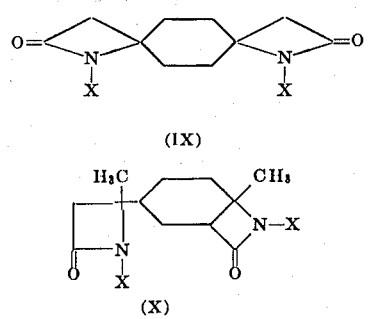

The β-lactams used as starting products may be prepared by known methods, for example from the corresponding olefins and chlorosulfonyl isocyanate (N-carbonyl-sulfamic acid chloride) (cf. R.Graf, Angew. Chem. 80 (1968),page 179 et sequ.,especially pages 183 to 185; Angew. Chem. Int. Ed. 7 (1968), page 172 et sequ.). Hence, the olefins used are, above all, α,α-disubstituted, α, α, β-trisubstituted and tetrasubstituted monoenes and aromatically substituted olefins of the styrene type. Furthermore, suitable compounds are, especially, bicyclic and polycyclic mono- and polyenes as well as allenes. It is also possible to start from α-substituted and α, β-disubstituted monoenes. Heterocyclic compounds, such as 2-isopropenyl-tetrahydrofuran, 2,5-dihydrofuran, 7-oxabicyclo-(2,2,1)-heptadiene-(2,5) or 7-oxabicyclo-(2,2,1)-hepta-2-ene-5, 6-bis-carboxylic acid methyl ester or 3,4-dialkyl-2, 5-dihydrothiophene dioxide (sulfolenes) are also suitable.

β-Lactams carrying carbalkoxy groups can be prepared by oxidation of alkenyl-substituted β-lactams by means of known oxidizing agents suitable for the oxidation of olefinic double bonds to yield the corresponding carboxylic acids and by esterification thereof, for example with diazo-alkanes.

4-Acyloxy-azetidin-2-ones are obtained from chlorosulfonyl isocyanate (N-carbonyl-sulfamic acid chloride) and the corresponding vinyl esters.

Among the 4-alkoxy-β-lactams that can be used as starting material only those are hitherto known which carry one or two halogen atoms in the 3-position. They can be obtained from the corresponding N-aryl-β-lactams prepared by condensation of Schiff's bases with halogenated ketenes by oxidative elimination of the aryl group.

Surprisingly, the rearrangement reaction of the invention is also applicable to optically active N-halogeno-β-lactams. The optically active starting products can, for example be obtained by converting the asymmetrical azetidinone by means of an alcoholic hydrogen chloride solution and benzaldehyde into the corresponding N-benzal-propionic acid ester which is hydrogenated to yield the corresponding β-benzylamino-propionic acid ester. This ester can be split by means of an optically active acid, for example tartaric acid, into the enantiomeric salts, from which the pure enantiomers of β-benzylamino-propionic acid ester are set free using bases. These can be converted in known manner by means of a Grignard compound into the N-benzyl-β-lactams from which the benzyl group is split off by means of sodium in liquid ammonia.

β-Lactams which are especially advantageous for the present invention are, for example, N-brominated derivatives of 4-alkyl-, 4-(monochloroalkyl)-, 4-(monobromoalkyl)-, 3,4-dialkyl-, 4,4-dialkyl-, 4-alkyl-4-(monochloroalkyl)-azetidinones-(2), the alkyl groups of which contain preferably from 1 to 4 carbon atoms, as well as of 4-vinyl-azetidinone-(2) and the compounds of the formulas IIIa, IIIb, IIIc, IV and VII and 4-acetoxy-azetidinone-(2).

As unsaturated compounds which are necessary for the rearrangement according to the invention there may generally be used all olefins and/or acetylenes which contain one or several C=C double bonds and/or C ≡ C triple bonds but no functional groups that would react with the isocyanate group, advantageously alkenes, alkane-dienes, alkynes, halogenated alkenes, vinyl esters and/or vinyl ethers which boil at normal pressure below 150° C, preferably between about 25° and about 120° C. Especially used are olefins of a simple structure which can be obtained without great technical effort, for example ethylene, acetylene, propene, butene-(1), butene-(2), 4-methyl-pentene-(1), styrene, phenyl-acetylene, butadiene, isoprene, allyl chloride, allyl bromide, methallyl chloride, vinyl chloride, vinylethyl ether or vinyl acetate or mixtures of these unsaturated compounds, since they can be separated from the isocyanates -optionally together with a solvent — by fractionated distillation at relatively low temperatures which are substantially lower than the boiling points of the isocyanates formed.

Even when added in an amount of about 0.01 mol per mol of N-halogeno-β-lactam the unsaturated compound used has a distinct effect. Generally, the olefins and/or acetylenes are added in an amount of from about 0.02 to about 6 mols per mol of N-halogeno-β-lactam.

According to a preferred embodiment of this process, the C—C unsaturated component is used in about 0.6 to about 8 parts by weight per part by weight of N-halogeno-azetidinone-(2), the unsaturated component serving at the same time as a solvent. Suitable olefins for this embodiment are, preferably, those which boil between 30° and about 100° C, for example allyl and methallyl chloride, 4-methyl-1-pentene, isoprene, cycloalkenes having 5 and 6 carbon atoms, and/or allyl esters of lower aliphatic carboxylic acids, for example allyl acetate.

The speed of the rearrangement reaction increases when the temperature is raised and it is proportional to the amount of olefin and/or acetylene in the reaction mixture. The reaction speed is furthermore very much influenced by the structure of the olefins and acetylenes.

In addition to the above influences, the rearrangement speed may also considerably be increased by exposing mixtures of N-bromo- or N-chloro-β-lactams and olefins and/or acetylenes to light of a wave length below 700 nm, preferably between 210 and 590 nm, or to high-energy irradiation, for example gamma-rays, X-rays or corpuscular rays, such as accelerated electrons. Under the action of these rays the rearrangement reaction is almost complete within some hours even at low temperatures, for example down to −200° C under the action of gamma-rays. The higher the energy of the rays the lower the temperatures required for the rearrangement reaction. Table I shows different reaction conditions and results obtained from rearrangements of N-bromo-β-lactams.

TABLE I

N-bromo-β-lactam $$\begin{array}{c} R^3 \;\; R^2 \\ | \;\;\;\; | \\ R^4-C-C-R^1 \\ | \;\;\;\; | \\ Br-N-C=O \end{array}$$

| N-bromo-β-lactam substituents | C=C-unsaturated compound in mol per mol of β-lactam | Type of irradiation | Reaction temperature in °C. | Reaction time in hours | Solvent (in ml. per mol of β-lactam) | Yield of (β-bromo-alkyl)-isocyanate in percent of the theory [1] |
|---|---|---|---|---|---|---|
| $R^1$, $R^2$, $R^3$=H, $R^4$=CH$_3$ | Methallyl chloride, 1.0 | ([2]) | +66 | 2.5 | CHCl$_3$(500) | 92 |
| $R^1$, $R^2$=H, $R^3$, $R^4$=CH$_3$ | Allyl chloride, 1.0 | ([2]) | +61-62 | 1.5 | CHCl$_3$(500) | 90 |
| $R^1$, $R^2$=H, $R^3$, $R^4$=CH$_3$ | Methallyl chloride, 1.0 | ([2]) | +46 | 2.5 | CH$_2$Cl$_2$(500) | 95 |
| $R^1$, $R^2$=H, $R^3$, $R^4$=CH$_3$ | Allyl chloride, 0.1 | ([2]) | +120 | 1.5 | | 90 |
| $R^1$, $R^3$=CH$_3$, $R^2$, $R^4$=H | Methallyl chloride, 1.0 | ([2]) | +83 | 0.25 | Cl·C$_2$H$_4$·Cl (500) | 89 |
| $R^1$—$R^3$=—(CH$_2$)$_3$—, $R^2$, $R^4$=H | Methallyl chloride, 3.0 | ([2]) | 20-22 | 15 | | 80 |
| $R^1$—$R^3$=—(CH$_2$)$_3$—, $R^2$, $R^4$=H | do | ([2]) | 0-1 | 60 | | 15 |
| $R^1$, $R^2$, $R^3$=H, $R^4$=CH$_3$ | Allyl chloride, 1.0 | Wolfram incandescent lamp, 100 watts. | 62-64 | 1.5 | CHCl$_3$(500) | 87 |
| $R^1$, $R^2$, $R^3$=H, $R^4$=CH$_3$ | do | Osram-"Vitalux" incandescent GUR 53, 300-watt lamp. | 43 | 0.3 | CH$_2$Cl$_2$(300) | 89 |
| $R^1$, $R_3$=CH$_3$, $R^2$, $R^4$=H | Methallyl chloride, 1.0 | do | 45 | 0.1 | CH$_2$Cl$_2$(500) | 91 |
| $R^1$, $R_3$=CH$_3$, $R^2$, $R^4$=H | Allyl chloride, 6.0 | Daylight | 53 | 0.5 | | 91 |
| $R^1$, $R_3$=CH$_3$, $R^2$, $R^4$=H | Methallyl chloride, 6.0 | do | 77 | 0.75 | | 88 |
| $R^1$, $R_3$=CH$_3$, $R^2$, $R^4$=H | Isoprene, 4.0 | do | 38-40 | 2.0 | | 90 |
| $R^1$, $R_3$=CH$_3$, $R^2$, $R^4$=H | 4-methyl-1-pentene, 5.0 | do | 56 | 1.0 | | 93 |
| $R^1$,$R^3$=CH$_3$,$R^2$,$R^4$=H | Methallyl chloride, 6.0 | Osram-"Vitalux" incandescent lamp, GUR 53 300 watts. | −45 | 3.0 | | 92 |
| $R^1$,$R^3$=CH$_3$,$R^2$,$R^4$=H | Isobutene, 4.0 | do | −10 | 1.5 | CH$_2$Cl$_2$(180) | 90 |
| $R^1$,$R^3$=CH$_3$,$R^2$,$R^4$=H | Methallyl chloride, 1.0 | Cobalt-60-irradiator, dose rate 1.5×10$^5$ rad/h. | −45 | 3.0 | CH$_2$Cl$^2$ (500) | 88 |
| $R^1$,$R^2$=CH$_3$,$R^2$,$R^4$=H | do | do | −74 | 3.0 | CH$_2$Cl$_2$ (500) | 80 |
| $R^1$,$R^3$=CH$_3$,$R^2$,$R^4$=H | Isobutene, 6.0 | Cobalt-60-irradiator, dose rate 2.2×10$^5$ rad/h. | −193 | 6.0 | CH$_2$Cl$_2$ (500) | [3] 5-8 |
| $R^1$,$R^3$=CH$_3$,$R^2$,$R^4$=H | Allyl chloride, 0.6 | Cobalt-60-irradiator, dose rate 3×10$^5$ rad/h. | 44 | 2.0 | CH$_2$Cl$_2$ (500) | 90 |
| $R^1$,$R^2$=H,$R^3$,$R^4$=CH$_3$ | do | Cobalt-60-irradiator, dose rate 1.5×10$^5$ rad/h. | 61 | 0.25 | CHCl$_3$ (500) | 94 |
| $R^1$,$R^2$,$R^3$=H,$R^4$=CH$_3$ | Isoprene, 1.0 | Cobalt-60-irradiator, dose rate 4.5×10$^4$ rad/h. | 44 | 3.0 | CH$_2$Cl$_2$(500) | 80 |
| $R^1$, $R^2$, $R^3$=H, $R^4$=CHCH$_2$4(R) (+)—enantiomer. | 4-methyl-1-pentene, 2.0 | Cobalt-60-irradiator, dose rate 1.5×10$^5$ rad/h. | 0 | 1.5 | CH$_2$Cl$_2$(150) | 81 |
| $R^1$,$R^3$=—(CH$^2$)$_6$—$R^2$,$R^4$=H | Isobutene, 3.0 | Cobalt-60-irraditor, dose rate 1.5×10$^5$ rad/h. | −25 | 2.0 | CH$_2$Cl$_2$(150) | 82 |

[1] The yields are calculated on β-lactam as a starting material, hence they comprise both steps: the preparation of N-bromo-lactam and the rearrangement reaction.
[2] Without irradiation under exclusion of light.
[3] A mixture of isobutene and N-bromo-lactam was irradiated in the solid state. The yield was evaluated with the aid of an infrared spectrum of the crude reaction product.

When light is chosen for irradiation, all light sources, including day light, are generally suitable as far as they emit light of the wave length mentioned. Light of a wave length of from 300 to 590 nm is preferably used according to the invention. Thus, the irradiation sources used are conventional tungsten incandescent lamps, especially "daylight incandescent lamps," for example Osram "Ultra-vitalux" lamps and/or day light. The rays may pass through usual apparatus glass, thus simplifying very much an industrial-scale operation of the process. As irradiation sources there may, of course, also be used mercury burners both as external irradiation sources and in the form of immersion lamps provided with a quartz jacket. When the irradiation sources chosen emit so-called "high-energy rays," the speed at which the rearrangement of the invention takes place is still sufficiently high for an industrial-scale operation even at temperatures below −30° C. Table I also shows the yields of isocyanates obtained by the rearrangement at low temperatures under the action of gamma-rays produced by a cobalt-60 source. The evidence that the rearrangement actually takes place at low temperatures (less than −40° C) and not as a result of the isolation of the reaction products was established, inter alia, in the following manner: The rearrangement was carried out in methyl chloride solution in the presence of isobutylene at −65° C with exposure to gamma-rays for 4 hours. Methyl chloride and isobutylene were evaporated in vacuo at −40° C within 7 minutes. After a "flash distillation" the residue contained 82 percent of the theory of (bromoalkyl)-isocyanate (cf. Example 69).

Comparative tests showed that, at an olefin content below 5 percent and under the distillation conditions applied. corresponding N-bromo-β-lactam yields, within 3 hours, an amount of isocyanate below 4 percent of the theory only. Moreover, it appeared that an at least 65 percent-rearrangement of N-bromo-β-lactams at temperatures between −10° and +10°C requires a reaction time of more than 20 hours with the addition of methallyl chloride of up to 1 mol per mol of N-bromo-lactam, when the reaction is carried out without irradiation (including light). Table 1 furthermore demonstrates that the reaction time can be reduced to a few minutes at a temperature between 40° and 60° C under the action of light or high-energy irradiation.

The smooth, though slow, course of the rearrangement reaction at temperatures below 25° C without irradiation is very surprising. Alternatively, the smooth course of the rearrangement under the action of the above-mentioned rays is also surprising since it is known that N-halogeno-amides and N-halogeno-urethanes add very easily to C=C-double bonds under these conditions (cf. DAS 1 271 704, K. Schrage, Tetrahedron Letters 1966, p. 5795, K. Schrage, Tetrahedron Letters 1967, p. 3033). The strong tendency of N-bromo-amides to add to C=C-double bonds has also been disclosed by Z. Foldi, Chem. Ber. 63, p.2257 (1930). According to the process of the invention, however, the (β-bromo-alkyl)-isocyanates are obtained in a yield exceeding 75 percent, in the presence of olefins and/or acetylenes, and even in an excess of an olefin that is liquid under the reaction conditions, with exposure to ultraviolet light as well as under the action of gamma-rays, i.e. under conditions under which the above-mentioned addition reactions of N-halogeno-amides to double bonds take place. In spite of the known tendency of N-bromo- and N-chloro-β-lactams to rearrange into (β-halogeno-alkyl)-isocyanates under the action of radical-forming catalysts, it could not be expected that addition reactions, especially of N-bromo-β-lactams to C=C-double bonds, would take place to a very limited extent only, or would not take place at all, under the conditions of the invention, especially with irradiation. If the addition reactions mentioned above and known from the literature took place owing to the thermal treatment and/or irradiation, the proportion of N-halogeno-β-lactams reacting in this manner would be lost for the yield of halogeno-alkyl-isocyanates. The good yields of (β-bromo-alkyl)-isocyanates obtained according to the invention prove that the rearrangement reaction proceeds obviously quicker than the addition reaction.

It has been found that N-(β-bromo-alkyl)-β-lactams of the formula XI

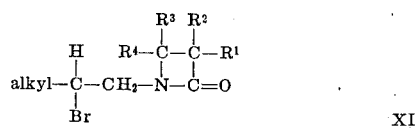

do not rearrange into isocyanates under the conditions of the present invention.

Furthermore, it is known that isocyanates polymerize and co-polimerize with compounds capable of polymerization under the action of gamma-rays (cf. C.A. 62 (1965) 642c, J. Fac. Eng. Univ. Tokyo 1, p. 46 (1936) published Japanese Patent application Nos. 15,932 (1962), filed Oct. 6, 1960, and 17,695 (1962), filed Oct. 29, 1960).

It has, moreover, been taught that alkyl-isocyanates are altered by decomposition reactions under the under of ultraviolet light at temperatures of from 20° to 100° C. Such an alteration is disclosed, for example, in J. Amer. Chem. Soc. 79, p. 2533 (1957). When the process of the invention is carried out with exposure to ultraviolet light, very short irradiation times (from 2 to 20 minutes) are already sufficient to achieve an almost complete rearrangement. Over such a short irradiation time, the (β-halogeno-alkyl)-isocyanates of formula I are obviously not altered to an appreciable extent, as the good yields demonstrate in the case of X being bromine. Appreciable amounts of decomposition products are obtained according to the invention only if N-chloro-β-lactams, and especially N-bromo-β-lactams, are exposed to light from mercury vapor burners in the form of quartz-jacket immersion lamps for more than 1 hour or to light from mercury vapor lamps through apparatus glass for more than 5 hours at a temperature exceeding 35° C.

By-products that would be formed under the reaction conditions of the invention in a manner similar to the cited addition reactions and/or owing to subsequent alterations of the isocyanates obtained would, in the first line, not only reduce the conversion rate into isocyanates but would also decisively aggravate the separation of the (β-halogeno-alkyl)-isocyanates by distillation. Compared with the process proposed in Tetrahedron Letters 1969, pages 117-120, the process of the invention shows various substantial advantages. Since no chemical compounds are incorporated as radical-forming agents which would cause formation of undesired by-products either in the form of their decomposition products or of compounds obtained by reactions of these decomposition products with the isocyanates, there are no residues resulting therefrom to have a disadvantageous effect on the isolation of the products of the invention, especially of (β-bromo-alkyl)-isocyanates. The working up, especially the distillation, of the β-chloro- and β-bromo-alkyl-isocyanates formed is simpler and leaves substantially less residues. To achieve a comparable rearrangement speed as reached under the exposure to light or upon boiling of the N-bromo-β-lactams in an excess of olefins and/or acetylenes boiling between 30° and 80° C, the known process requires relatively high amounts (more than 0.2 mol-percent of radical-forming catalysts which necessarily reduce the yield and increase the amount of the residues mentioned. In the course of the rearrangement reaction in the presence of radical-forming catalysts undesired by-products are also formed by a more or less intense polymerization or telomerization of the olefins and/or acetylenes used as additives. According to the process of the present invention, such polymerizations or telomerizations do not take place to an appreciable extent. Owing to the fact that the process of the invention requires only readily volatile C—C-unsaturated compounds in addition to the starting material for the preparation of isocyanates of the formula I and therefore only yields very small amounts of sparingly volatile or non volatile by-products, the process of the present invention can easily be carried out in a continuous manner.

The said advantages contribute to the fact that the (β-bromo-alkyl)-isocyanates of the invention are easily obtained in a yield of from 84 to 95 percent of the theory. Thus, especially the space-time yields are distinctly higher than those obtained by the process proposed in Tetrahedron Letters 1969, page 117. In the case of the corresponding chlorinated compounds the yield is substantially lower, generally below 40 percent of the theory.

The preparation of the isocyanates according to the invention can very simply be carried out on an industrial scale. A mixture consisting predominantly of impure N-bromo- or N-chloro-β-lactam and an olefin and/or acetylene, is allowed to stand over a period which is sufficient for a complete rearrangement reaction, optionally in the presence of an inert solvent. To accelerate the reaction the mixture is either heated to a temperature of from 30° to 90° C or heated to a temperature above 20° C while exposing it to light or to a high-energy irradiation at a temperature which preferably exceeds −40° C and, optionally heating it. Subsequently, the reaction mixture is subjected to a fractionated distillation in vacuo.

The process of the invention which, in comparison to the known syntheses of isocyanates, can very simple be carried out in practice for the preparation of isocyanates of the formula I differs in principle from the methods hitherto proposed.

Compared with the process known from Tetrahedron Letters, loc. cit., the novel simplified and improved process of the invention for the rearrangement of N-bromo- and N-chloroazetidinones-(2) has a very wide scope of application. According to this process, a great variety of isocyanates which hitherto have been very difficult to prepare or have not at all been obtainable can now be prepared in a simple manner and in a single reaction step.

In addition to the great number of possible modifications obtained with the isocyanate group, the compounds prepared according to the invention permit some further possible reactions for a synthesis, due to the bromine or chlorine atom linked in the $\beta$-position to the isocyanate group. Therefore, the ($\beta$-bromo- and $\beta$-chloro-alkyl)-isocyanates obtained according to the invention are valuable intermediates suitable for a variety of applications, for example in the manufacture of pesticides or plastic materials.

The new $\alpha$-acyloxy-$\beta$-halogenoalkyl isocyanates are especially useful intermediate products for organic syntheses, in as much as those notoriously reactive groups — the isocyanate, the acyloxy and an $\alpha$-halogenoalkyl group — are bound to one carbon atom. If the isocyanate group is transformed into the amino group by known hydrolysis and decarboxylation, a N-O-acetal moiety is obtained, i.e. a derivative of a highly reactive halogeno-acetaldehyde.

The $\alpha$-acyloxy-$\beta$-bromo-isocyanates react in known manner with dialkyl amines to yield 2-dialkyl-amino-4-acetoxy-2-oxazolines, which can be hydrolyzed and subsequently oxydized to the corresponding 4-oxo-compounds, which are known central stimulants and have anorextic properties (J. Org. Chem. 27 (1962) 1679–1685).

The following examples serve to illustrate the invention.

EXAMPLE 1 a. Preparation of N-bromo-4-methyl-azetidinone-(2): 160 g of bromine were added dropwise while vigorously stirring at room temperature within 30 minutes to a mixture of 85 g (1 mol) of 4-methyl-azetidinone-(2), 120 g (1.45 mols) of sodium bicarbonate, 500 ml of methylene chloride and 300 ml of water, and stirring was continued for 10 to 20 minutes until the reaction mixture had a faintly yellow color. The mixture was then suction-filtered, the filter residue was washed with a small amount of methylene chloride, the phases of the filtrate were separated and the aqueous phase was shaken once or twice with methylene chloride. The methylene chloride extracts were united with the corresponding phase of the filtrate of the reaction mixture, the solution was then dried over sodium sulfate, filtered off and evaporated in vacuo at a bath temperature of 37° – 40° C by means of a rotatory evaporator. The residue consisted of from 162 to 168 g of crude N-bromo-4-methyl-azetidinone-(2) in the form of a viscous oil having a faintly yellow-brown color. This product was used without further purification as the starting material for the rearrangement reaction.

b. Rearrangement of N-bromo-4-methyl-azetidinone-(2): A mixture of 162 – 168 g of crude N-bromo-4-methylazetidinone-(2) as obtained after the aforementioned bromination of 1 mol of 4-methyl-2-azetidinone, 500 ml of chloroform and 90.5 g ($\triangleq$ 99 ml $\triangleq$ 1 mol) of methallyl chloride was refluxed for 2.5 hours. Subsequently, the low-boiling solvent and the olefin were first distilled off in vacuo and then ($\beta$-bromo-isopropyl)-isocyanate formed was isolated by fractionated distillation of the crude reaction product. Boiling point: 57.8° C, under a pressure of 14 torr; $n_D^{20}$: 1.4712; yield: 151 g = 92 percent of the theory. This yield and the yields cited in the following examples of ($\beta$-bromo-alkyl)-isocyanates are calculated on the starting $\beta$-lactam used for the N-bromination, i.e., on both steps.

EXAMPLE 2

When the rearrangement reaction disclosed in Example 1 sub b was carried out by refluxing for 3 hours under the exclusion of light, 141 g (86 percent of the theory) of pure ($\beta$-bromo-isopropyl)-isocyanate were obtained after distillation.

EXAMPLE 3

A mixture of 166 g of crude N-bromo-4-methyl-azetidinone-(2) prepared according to Example 1 a, 500 ml of methylene chloride and 99 ml (1 mol) of methallyl chloride was refluxed for 3 hours under the exclusion of light. After fractionated distillation in vacuo 148 g (90 percent of the theory) of pure ($\beta$-bromo-isopropyl)-isocyanate were isolated.

EXAMPLE 4

A mixture of 81 g (0.5 mol) of crude N-bromo-4-methyl-azetidinone-(2) and 5 ml (0.05 mol) of methallyl chloride was heated to 90° C under the exclusion of light. Subsequently, the temperature rose suddenly to 116° C. The reaction mixture was maintained at this temperature for 15 minutes and then subjected to fractionated distillation in vacuo. In addition to a considerable amount of distillation residue, 35 g (43 percent of the theory) of pure ($\beta$-bromo-isopropyl)-isocyanate were obtained.

EXAMPLE 5

A mixture of 164 g of crude N-bromo-4-methyl-azetidinone-(2), 200 ml of 1,2-dichloro-ethane and 99 ml (1 mol) of methallyl chloride was heated to 90° C for 12 minutes under the exclusion of light. After fractionated distillation in vacuo 143 g ( 87 percent of the theory) of pure ($\beta$-bromo-isopropyl)-isocyanate were obtained.

EXAMPLE 6

A mixture of 179 g of crude N-bromo-4, 4-dimethyl-azetidinone-(2) prepared in the same manner as disclosed in Example 1 a, 500 ml of chloroform and 81 ml (1 mol) of allyl chloride was refluxed for 1.5 hours under the exclusion of light. Subsequently the reaction mixture was subjected to fractionated distillation in vacuo. The ($\beta$-bromo-tertiary-butyl)-isocyanate formed boiled at 51.3° C under a pressure of 10 torr; $n_D^{20}$: 1.4633. The yield of isocyanate was 160 g (90 percent of the theory).

EXAMPLE 7

The same mixture as disclosed in Example 6 was refluxed for 1.3 hours at day-light. After fractionated distillation in vacuo 163 g (92 percent of the theory) of pure ($\beta$-bromo-tertiary-butyl)-isocyanate were obtained.

EXAMPLES 8 to 12

Rearrangement of N-bromo-4, 4-dimethyl-azetidinone-(2) under the exclusion of light; the reaction and isolation of ($\beta$-bromo-tertiary-butyl)-isocyanate were carried out as disclosed in Example 6.

TABLE 2

| Example | Mol of N-bromo-lactam | Mol of allyl chloride/ mol of β-lactam | Mol of methallyl chloride/ mol of β-lactam | Solvent in ml. | Internal temperature in °C. | Reaction time in hours | Yield of isocyanate in percent of the theory |
|---|---|---|---|---|---|---|---|
| 8 | 1.0 | 0.5 | | CHCl₃ (500) | 61–62 | 1.5 | 88 |
| 9 | 1.0 | 0.1 | | CHCl₃ (50) | 85 | 2.0 | 73 |
| 10 | 1.0 | 1.0 | | CH₂Cl₂ (500) | 42–44 | 2.5 | 58 |
| 11 | 1.0 | 0.1 | | | 120 | 1.5 | 90 |
| 12 | 1.0 | | 1.0 | CH₂Cl₂ (500) | 45–46 | 2.5 | 95 |

EXAMPLES 13 to 19

Rearrangement of N-bromo-3, 4-dimethyl-azetidinone-(2) under exclusion of light; reaction and isolation corresponding to Table 2; (β-bromo-isobutyl)-isocyanate was formed.

TABLE 3

| Example | Mol of N-bromo-lactam | Mol of allyl chloride/ mol of β-lactam | Mol of methallyl chloride/ mol of β-lactam | Solvent in ml. | Internal temperature in °C. | Reaction time in hours | Yield of isocyanate in percent of the theory |
|---|---|---|---|---|---|---|---|
| 13 | 1.0 | 1.0 | | CH₂Cl₂ (500) | 42–44 | 3.0 | 89 |
| 14 | 1.0 | 1.0 | | CHCl₃ (500) | 61–62 | 2.0 | 87 |
| 15 | 1.0 | 0.6 | | CHCl₃ (400) | 62 | 2.0 | 85 |
| 16 | 0.5 | | 1.0 | Cl.C₂H₄Cl (250) | 83 | 0.25 | 89 |
| 17 | 0.5 | | 0.1 | CH₂Cl₂ (250) | 44 | 3.0 | 54 |
| 18 | 0.5 | | 0.2 | Cl.C₂H₄Cl (200) | 83 | 0.5 | 68 |
| 19 | 0.5 | | 3.0 | | 33–34 | 6.0 | 43 |

EXAMPLE 20

A mixture of 96 g (0.5 mol) of crude N-bromo-3, 4-trimethylene-azetidinone-(2) prepared as in Example 1 a and 150 ml of methallyl chloride was kept away from light for 15 hours at 20°–22° C. Subsequently, the methallyl chloride was eliminated at room temperature under a pressure of 2 torr; and the remaining residue was distilled under the same pressure. The distillate was distilled again in vacuo, and 76 g ( 80 percent of the theory) of pure (2-bromo-cyclopentyl)-isocyanate were obtained as a cis/trans-mixture. Boiling point 80° – 83° C under a pressure of 12 torr, $n_D^{20}$: 1.5044.

EXAMPLE 21

A mixture of 117 g (0.5 mol) of crude N-bromo-3, 4-hexamethylene-azetidinone-(2) prepared according to Example 1 a and 200 ml of cyclo-octene was heated to 90° C for 2 hours under the exclusion of light. The mixture was then subjected to fractionated distillation in vacuo (less than 2 torr). The isocyanate formed boiled at 72°–76° C under a pressure of 0.01 torr. 65–73 g ( 56–63 percent of the theory) of pure (2-bromo-cyclooctyl)-isocyanate were obtained, $n_D^{20}$: 1.5200.

EXAMPLE 22

A mixture of 113 g (0.5 mol) of crude crystallized N-bromo-4-phenyl-azetidinone-(2) obtained according to Example 1 a, 200 ml of chloroform and 75 ml (0.75 mol) of methallyl chloride was refluxed for 2 hours under the exclusion of light. Subsequently, the chloroform and the methallyl chloride were distilled off under a pressure of 2 torr. The viscous oily residue was distilled under greatly reduced pressure by means of a thin-layer evaporator. 95 g ( 83 percent of the theory) of (2-bromo-1-phenyl-ethyl)-isocyanate were obtained, boiling point : 69° – 72° C under a pressure of 0.01 torr; $n_D^{20}$: 1.5652.

EXAMPLE 23 a. Preparation of N-bromo-4-vinyl-azetidinone-(2)

97 g (1 mol) of 4-vinyl-azetidinone-(2), 600 ml of carbon tetrachloride and 178 g (1 mol) of N-bromo-succinimide were mixed, 10 mg of dibenzoyl peroxide were added and the mixture was heated to 43°–47° C. When the reaction was complete, 150 ml of hexane were added, the mixture was cooled to 4° – 8° C and the undissolved succinimide was separated by suction-filtration. The filtrate was evaporated in vacuo. 170–180 g of crude viscous oily N-bromo-4-vinyl-azetidinone-(2) were obtained. This product was used as a starting material for the rearrangement reaction.

b. Rearrangement of N-bromo-4-vinyl-azetidinone-(2)

A mixture of 174 g (1 mol) of crude N-bromo-4-vinyl-azetidinone-(2), 300 ml of methylene chloride and 99 ml of methallyl chloride (1 mol) was refluxed for 2.5 hours. Subsequently, the reaction mixture was subjected to fractionated distillation in vacuo. 153 g (87 percent of the theory) of pure (2-bromo-1-vinyl-ethyl)-isocyanate were obtained; boiling point 58° C under a pressure of 7 torr; $n_D^{20}$: 1.4916.

EXAMPLE 24

A mixture of 88 g (0.5 mol) of crude N-bromo-4-vinyl-azetidinone-(2) prepared according to Example 23 a, 200 ml of chloroform and 51 g (0.75 mol) of isoprene was refluxed for 3 hours under the exclusion of light. Subsequently, the reaction mixture was subjected to fractionated distillation. 58 g (66 percent of the theory) of pure (2-bromo-1-vinyl-ethyl)-isocyanate were obtained.

EXAMPLE 25

A mixture of 214 g (1 mol) of crude N-bromo-4-methyl-4-chloromethyl-azetidinone-(2) prepared according to Example 1 a, 350 ml of 1,2-dichloro-ethane and 65 ml (0.8 mol) of allyl chloride was heated to 85° C for 1 hour. Subsequently, the reaction mixture was subjected to fractionated distillation. 155 g ( 73 percent of the theory) of pure (β-bromo-β'-chloro-tertiary-butyl) isocyanate were obtained, boiling point : 40° C under a pressure of 1.6 torr, $n_D^{20}$ : 1.4974; analysis calculated for $C_5H_7BrClNO$: C 28.26; H 3.32; Br 37.61; Cl 16.68; N 6.59;, found: C 28.0; H 3.3; Br 38.2; Cl 17.0; N 6.3; the molecular weight established by mass spectrometry was almost the same as that which had been calculated (212.5).

EXAMPLE 26

40 – 45 g of propene (about 1 mol) were condensed into a mixture which had been cooled to −60° C and which consisted of 166 g of crude N-bromo-4-methyl-azetidinone-(2) and 400 ml of 1,2-dichloro-ethane. This mixture was filled in an autoclave of a capacity of 2 liters, at a temperature below −25° C and heated to 90° C for 2 hours under autogenous pressure. Subsequently, the readily volatile constituents of the mixture were eliminated in vacuo and the residue was distilled in vacuo. 103 g (63 percent of the theory) of pure (β-bromo-isopropyl)-isocyanate were obtained.

EXAMPLE 27

A mixture of 117 g (0.5 mol) of N-bromo-4-methyl-4-carbethoxy-azetidinone-(2), 250 ml of methylene chloride and 50 ml (0.5 mol) of methallyl chloride was refluxed for 2.5 hours. Subsequently the reaction mixture was subjected to fractionated distillation in vacuo. 107 g (91 percent of the theory) of pure (α-carbethoxy-β-bromo-isopropyl)-isocyanate were obtained. Boiling point: 70°–71° C under a pressure of 0.6 torr; $n_D^{20}$: 1.4628.

EXAMPLE 28

A mixture prepared in a manner analogous to Example 1 a and consisting of 103 g (0.5 mol) of crude N-bromo-3, 4-tetramethylene-azetidinone-(2), 150 ml of chloroform and 51 g (0.75 mol) of pentine-(1) was refluxed for 2 hours under the exclusion of light. The reaction mixture was then subjected to fractionated distillation. 83.5 g (82 percent of the theory) of chemically pure (2-bromo-cyclohexyl)-isocyanate were obtained in the form of an about 1 : 1 cis/trans mixture.

EXAMPLE 29 a. A mixture of 1 mol of crude N-bromo-3, 4-dimethyl-azetidinone-(2) and 600 ml (6 mols) of methallyl chloride was refluxed for 45 minutes and then subjected to fractionated distillation in vacuo. 157 g (= 88 percent of the theory) of pure (β-bromo-isobutyl)-isocyanate (threo-erythro mixture) were obtained.

b. A mixture consisting of 0.5 mol of crude (+)-N-bromo-4(R)-vinyl-azetidinone-(2) and prepared according to Example 23 a and 300 ml (3 mols) of methallyl chloride was refluxed for 0.6 hour and then subjected to fractionated distillation in vacuo. 75 g (= 85 percent of the theory) of pure (S) (-)-4-bromo-3-isocyanato-butene-(1) were obtained; $[\alpha]_D^{23}$: (−) 47.1° (c = 1.590, methylene chloride); $[\alpha]_D^{23}$ : (−) 73.0° (not diluted; 1 dm); $n_D^{20}$: 1.4919.

EXAMPLE 30

A mixture of 1 mol of crude N-bromo-3, 4-dimethyl-azetidinone-(2) and 400 ml (4 mols) of isoprene was refluxed for 2 hours and then subjected to fractionated distillation in vacuo. 160 g (90 percent of the theory) of pure (β-bromo-isobutyl)-isocyanate (threo-erythro mixture) were obtained.

EXAMPLE 31

A mixture of 1 mol of crude N-bromo-4-methyl-4-chloromethyl-azetidinone-(2) and 400 ml of methallyl chloride was refluxed for 1.3 hours and then subjected to fractionated distillation in vacuo. 178 g (84 percent of the theory) of pure (β-bromo-β'-chloro-tertiary-butyl)-isocyanate were obtained.

EXAMPLE 32

400 g of N-bromo-4-methyl-β-lactam were added dropwise while refluxing and stirring within 40 minutes to a mixture of 1 liter of methallyl chloride and 100 g of N-bromo-4-methyl-azetidinone-(2). Refluxing was continued for 20 minutes and the mixture was then subjected to fractionated distillation in vacuo. After distillation 435 g (87 percent of the theory) of pure (β-bromo-isopropyl)-isocyanate were obtained.

EXAMPLE 33 a. A mixture of 0.5 mol of crude N-bromo-4-methyl-β-lactam, 150 ml of methylene chloride and 40 ml of allyl chloride was exposed to light from an Osram "Vitalux" incandescent lamp GUR 53 of 300 Watts for 18 minutes at an internal temperature of 43° C, the reaction mixture then subjected to fractionated distillation in vacuo. 72 g (88 percent of the theory) of pure (β-bromo-isopropyl)-isocyanate were obtained.

b. A mixture of 0.5 mol (83–84 g) of crude (−)-N-bromo-4-(R)-methyl-azetidinone-(2), 250 ml of chloroform and 40 ml of allyl chloride was exposed for 1.5 hours to light from a usual 100 Watt incandescent lamp at reflux temperature. The mixture was then worked up in the manner disclosed sub (a). 71 g (87 percent of the theory) of pure (R) (−)-(β-bromo-isopropyl)-isocyanate were obtained; $\alpha_D^{23}$: (−) 35.1° (not diluted, 1 dm); $[\alpha]_D^{23}$: 23°–0° (methylene chloride, c= 1.137); $n_D^{20}$: 1.4715.

EXAMPLE 34 a. A mixture of 0.5 mol of crude N-bromo-4-methyl-4-chloromethyl-azetidinone-(2), 50 ml of methallyl chloride and 200 ml of methylene chloride was exposed for 2 hours to light from an Osram "Vitalux" incandescent lamp GUR 53 of 300 Watts at reflux temperature and then subjected to fractionated distillation in vacuo. 87 g (82 percent of the theory) of pure (β-bromo-β'-chloro-tertiary-butyl)-isocyanate were obtained.

b. A mixture of 0.5 mol of crude N-bromo-4-methyl-4-chloromethyl-azetidinone-(2), 100 ml of methallyl chloride and 200 ml of methyl chloride was exposed for 3 hours to light from a usual 200-watt-incandescent lamp at reflux temperature and then subjected to fractionated distillation in vacuo. 82 g (77 percent of the theory) of pure (β-bromo-β'-chloro-tertiary-butyl)-isocyanate were obtained.

EXAMPLE 35

A mixture of 0.25 mol of crude N-bromo-4-n-decyl-azetidinone-(2), 200 ml of methylene chloride and 40 ml of allyl chloride was exposed for 30 minutes to light from an Osram "Vitalux" incandescent lamp GUR 53 of 300 watts at an internal temperature of 44° C. Subsequently, the low-boiling constituents of the reaction mixture were eliminated in vacuo and the remaining viscous oily residue was distilled at greatly reduced pressure on a thin-layer evaporator. The (1-bromomethyl-undecyl)-isocyanate formed boiled at 103°–111 °C under a pressure of 0.01 torr; $n_D^{30}$: 1.482. 53 g (73 percent of the theory) of isocyanate were obtained.

EXAMPLE 36

A mixture of 0.25 mol of crude N-bromo-3, 4-dimethylazetidinone-(2), 125 ml of methylene chloride and 25 ml of methallyl chloride was rapidly heated to 44° C under the exclusion of light and then exposed for 6 minutes to light from an Osram "Vitalux" incandescent lamp GUR 53 of 300 watts. Subsequently, the reaction mixture was rapidly cooled to 0°–3° C and evaporated in vacuo at this temperature. The residue was subjected to fractionated distillation in vacuo. 40.5 g (91 percent of the theory) of ($\beta$-bromo-isobutyl)-isocyanate were obtained.

When (−)-N-bromo-trans-3, 4-dimethyl-azetidinone-(2) was used as starting material ( $[\alpha]_D^{23}$ : 7.0° ± 0.3°, c = 2.00, methylene chloride), 2-isocyanato-3-bromo-butane was obtained in the form of a 1 : 1 mixture of diastereomers having a rotation of $[\alpha]_D^{24}$: (−) 2.7° (c = 1.48, methylene chloride).

When the mixture was exposed for 30 minutes, instead of in the manner disclosed above, to light from a usual 100-watt-incandescent lamp, the yield of isocyanate, after distillation, was 87 percent of the theory.

EXAMPLE 37

A mixture prepared at −25° C from 0.25 ml of crude N-bromo-3, 4-trimethylene-azetidinone-(2) and 150 ml of methallyl chloride wad exposed while stirring at −46° C for 3 hours to light from the "Vitalux" lamp mentioned in Example 36. Subsequently, the methallyl chloride was evaporated at −15° to −25° C under greatly reduced pressure.

The infrared spectrum of the residue indicated that the N-bromo-lactam was almost completely rearranged into isocyanate. The crude reaction product was distilled in vacuo. 43 g (91 percent of the theory) of pure (2-bromo-cyclopentyl)-isocyanate (cis/trans mixture) were obtained.

EXAMPLE 38

A mixture prepared at −25° C from 0.5 mol of crude N-bromo-3, 4-hexamethylene-azetidinone-(2), 75 ml of methylene chloride and 84 g (1.5 mol) of isobutene was exposed to light while stirring at −25° C for 2 hours as disclosed in Example 36. Subsequently, the low-boiling constituents of the reaction mixture were evaporated at −10° to −12° C under greatly reduced pressure. The residue, the infrared spectrum of which still contained a very faint lactam-carbonyl band, was distilled in vacuo. 185 g (80 percent of the theory) of pure (2-bromo-cyclooctyl)-isocyanate were obtained; boiling point : 72° − 75° C under a pressure of 0.01 torr; $n_D^{20}$ : 1.5201. The values of C, H, Br and N obtained by the elementary analysis were almost the same as the calculated values and the molecular weight determined by mass spectrometry corresponded to the calculated value.

EXAMPLE 39

A mixture of 0.1 mol of crude N-bromo-4-ethyl-azetidinone-(2) and 28 g (0.4 mol) of pentine-(1) was refluxed for 5 hours. The mixture was then subjected to fractionated distillation in vacuo. 14.2 g (80 percent of the theory) of (2-bromo-1-ethyl-ethyl)-isocyanate were obtained.

EXAMPLE 40

A mixture of 0.25 mol of crude N-bromo-3-aza-tricyclo (4.2.1.0.$^{2,5}$) nonanone-(4) and 100 ml of allyl chloride was refluxed for 12 minutes and then subjected to fractionated distillation in vacuo. 50 g (92 percent of the theory) of pure 2-bromo-3-isocyanato-bicyclo-(2.2.1)-heptane were obtained; boiling point : 50° C under a pressure of 0.2 torr; $n_D^{20}$: 1.5153. The isocyanate showed correct analytical values for $C_8H_8BrNO$ and the molecular weight determined by mass spectrometry corresponded to the calculated value.

EAMPLE 41

A mixture of 0.25 mol of crude N-bromo-4-carbomethoxy-azetidinone-(2) and 84 g (1 mol) of 4-methyl-pentene-(1) was exposed for 24 minutes to light from an Osram "Vitalux" incandescent lamp GUR 53 of 300 watts at reflux temperature. Subsequently, the reaction mixture was subjected to fractionated distillation in vacuo. After re-distillation, in vacuo, 38 g (73 percent of the theory) of pure (2-bromo-1-carbomethoxy-ethyl)-isocyanate were obtained; boiling point : 53° C under a pressure of 0.2 torr; $n_D^{30}$ : 1.4733; m.p. 29° − 30° C. The isocyanate showed the correct analytical values for $C_5H_6BrNO_3$, and the calculated molecular weight was determined by mass spectrometry.

EXAMPLE 42

A mixture prepared at −15° C from 0.5 mol of crude N-bromo-4-methyl-4-n-propyl-azetidinone-(2), 30 ml of methylene chloride and 112 g (2 mols) of isobutene was exposed to light from the lamp used in Example 41 at −7° C for 1.5 hours. The low-boiling portions of the mixture were then evaporated at −5° to −10° C at greatly reduced pressure and the (2-bromo-1methyl-1-n-propyl-ethyl)-isocyanate was distilled in vacuo. 93 g (90 percent of the theory) of pure isocyanate were obtained; boiling point : 74° C under a pressure of 6 torr; $n_D^{20}$: 1.4680. The analytical values obtained and the molecular weight determined by mass spectrometry confirmed the constitution $C_7H_{12}BrNO$.

EXAMPLE 43

A mixture of 0.5 mol of crude N-bromo-4, 4-dimethyl-azetidinone-(2) and 210 g of 4-methyl-pentene-(1) was refluxed for 1 hour and then subjected to fractionated distillation in vacuo. 85 g (94 percent of the theory) of pure ($\beta$-bromo-tertiary-butyl)-isocyanate were obtained.

EXAMPLE 44

A mixture of 0.5 mol of pure N-chloro-4,4-dimethyl-azetidinone-(2) and 300 ml (3 mols) of methallyl chloride was exposed for 4 hours to light from the lamp used in Example 41 at reflux temperature. The reaction mixture was then subjected to fractioned distillation in vacuo. The isocyanate fraction was distilled three times. Subsequently, 10.7 g (16 percent of the theory) of 92 percent (β-chloro-tertiary-butyl)-isocyanate determined by gas chromatography; boiling point : 52.5° C under a pressure of 24 torr; $n_D^{20}$: 1.4355.

EXAMPLE 45

A mixture 33 g (about 0.12 mol) of crude N-bromo-3, 3-dichloro-ethoxy-azetidinone-(2) prepared according to Example 1 a and 80 ml of methallyl chloride was exposed for 1 hour to light from an Osram-Vitalux incandescent lamp GUR 53 of 300 watts at an internal temperature of from 70° to 73° C. The reaction mixture was then evaporated in vacuo. The viscous oily residue was dissolved in 50 ml of ether and 150 ml of n-hexane were added to the solution. A highly viscous substance precipitated which was separated by decanting from the solution. The solution of ether and hexane was evaporated in vacuo and the residue (a viscous oil) was subjected to fractionated distillation at greatly reduced pressure. A fraction which distilled over between 85° and 92° C at a pressure of 0.01 torr proved, after determination by gas chromatography, to be an about 85 percent-(2.2.2-bromo-dichloro-1-ethoxy-ethyl)-isocyanate which was obtained in a yield of 18.6 g (50 percent of the theory); $n_D^{20}$: 1.5032.

EXAMPLE 46

A mixture of 0.5 mol of crude N-bromo-4-acetoxy-azetidinone-(2) prepared at 0° C according to Example 1 a, 400 ml of methylene chloride and 80 ml (1 mol) of allyl chloride was exposed for 20 minutes, while refluxing, to light from an Osram Vitalux incandescent lamp GUR 53 of 300 watts. The reaction mixture was then subjected to fractionated distillation in vacuo. The (2-bromo-1-acetoxy-ethyl)-isocyanate formed distilled over at 47°–48° C under a pressure of 0.5 torr. 82 g (79 percent of the theory) of pure (2-bromo-1-acetoxy-ethyl)-isocyanate were obtained; $n_D^{20}$: 1.4705. The infrared spectrum coincided with the structure of the isocyanate.

The values found by the elementary analysis and the molecular weight determined by mass spectrometry corresponded to the constitution $C_5H_6BrNO_3$.

EXAMPLE 47

A mixture of 0.5 mol of crude N-bromo-4-methyl-azetidinone-(2), 250 ml of methylene chloride and 24 ml (0.3 mol) of allyl chloride was exposed for 3.2 hours at reflux temperature (43°–44° C) to gamma rays produced by a cobalt-60 source having a dose rate of 4.5 × 10⁴ rad/h. Subsequently, the reaction mixture was subjected to fractionated distillation in vacuo. 73.5 g (= 89.5 percent of the theory) of pure (β-bromoisopropyl)-isocyanate were obtained.

EXAMPLE 48

A mixture prepared at −50° C from 0.5 mol of crude N-bromo-3, 4-dimethyl-azetidinone-(2), 175 ml of methylene chloride and 50 ml of methallyl chloride (0.5 mols) was exposed at −68° C for 3 hours to gamma rays produced by a cobalt-60 source at a dose rate of 1.5 × 10⁵ rad/h. Subsequently, the readily volatile constituents of the reaction mixture were evaporated at a temperature below −5° C at greatly reduced pressure.

EXAMPLES 50 TO 70

[Rearrangement reactions with exposure to gamma-rays produced by a cobalt-60 source]

| Example No. | β-lactam (X–N with $R^1, R^2, R^3, R^4$) | C=C-unsaturated compound in mol per mol of β-lactam | Solvent (in ml. per mol of β-lactam) | Reaction temperature in °C. | Dose rate in rad/h. | Irradiation time in hours | Yield of β-bromo- or β-chloro-alkyl isocyanate in percent of the theory |
|---|---|---|---|---|---|---|---|
| 50 | X=Br; $R^4$=CH₃; $R^1, R^2, R^3$=H | Isoprene (1.0) | CHCl₃ (500) | 59–60 | 4.5×10⁴ | 2.0 | 87 |
| 51 | Same as above | 4-methyl-1-pentene (3.0) | | 22 | 3×10⁵ | 3.0 | 83 |
| 52 | X=Br; $R^1, R^3$=CH₃; $R^2, R^4$=H | Isobutene (1.0) | CH₂Cl₂ (300) | −8 | 3×10⁵ | 1.5 | 83 |
| 53 | Same as above | Methallyl chloride (1.0) | CH₂Cl₂ (300) | −45 | 1.5×10⁵ | 3.0 | 88 |
| 54 | do | Methallyl chloride (0.4) | Cl·C₂H₄·Cl (500) | 85 | 4.5×10⁴ | 0.15 | 91 |
| 55 | X=Br; $R^2, R^4$=H; $R^1, R^3$=—(CH₂)₃— | Pentine-(1) (1.0) | | 0 | 1.5×10⁵ | 1.0 | 85 |
| 56 | Same as above | Allyl acetate (2.0) | | 15 | 1.5×10⁵ | 3.0 | 84 |
| 57 | X=Br; $R^2, R^4$=H; $R^1, R^3$=—(CH₂)₆— | Allyl chloride (0.6) | n-C₃H₇Cl (500) | 23 | 1.5×10⁵ | 3.0 | 80 |
| 58 | X=Br; $R^1, R^2$=H; $R^3$=CH₃; $R^4$=CH=CH₂ | 4-methyl-1-pentene (1.0) | CH₂Cl₂ (300) | 42 | 1.5×10⁵ | 2.0 | 82 |
| 59 | X=Br; $R^4$=CH=CH₂; $R^1, R^2, R^3$=H | Cyclohexene (4.0) | | 30 | 1.5×10⁵ | 3.0 | 81 |
| 60 | X=Br; $R^4$=CH=CH₂; $R^1, R^2, R^3$=H, 4-(R)-(+) enantiomer | 4-methyl-1-pentene (2.0) | CH₂Cl₂ (150) | 0 | 1.5×10⁵ | 1.5 | 81 |
| 61 | X=Br; $R^1, R^2$=H; $R^3$=CH₃; $R^4$=CH₂Cl | Allyl chloride (0.5) | CHCl₃ (500) | 62 | 1.5×10⁵ | 4.0 | 80 |
| 62 | X=Br; $R^1, R^2$=H; $R^3, R^4$=CH₃ | Allyl chloride (0.6) | CHCl₃ (500) | 61 | 1.5×10⁵ | 0.2 | 94 |
| 63 | X=Br; $R^4$=COOCH₃; $R^1, R^2, R^3$=H | Methallyl chloride (1.0) | CH₂Cl₂ (150) | 44 | 4.5×10⁴ | 1.0 | 78 |
| 64 | X=Br; $R^4$=C₆H₅; $R^1, R^2, R^3$=H | Isoprene (2.0) | CH₂Cl₂ (300) | 41 | 1.5×10⁵ | 2.0 | 77 |
| 65 | (bicyclic β-lactam with N–Br) | Isoprene (6.0) | | 22 | 1.5×10⁵ | 2.0 | a 79 |
| 66 | (bicyclic β-lactam with N–Br) | Isoprene (1.0) | CH₂Cl₂ (300) | 0 | 1.5×10⁵ | 3.0 | 86 |
| 67 | X=Br; $R^1, R^2$=H; $R^3$=CH₃; $R^4$=CH₂Cl | Methallyl chloride (6.0) | | 40 | 3×10⁵ | 0.3 | 78 |
| 68 | X=Cl; $R^4$=CH₃; $R^1, R^2, R^3$=H | Methallyl chloride (5.0) | | 30 | 3×10⁵ | 15 | 11 |
| 69 | X=Br; $R^2, R^4$=H; $R^1$=—$R^3$=—(CH₂)₃— | Isobutene (3.0) | CH₃Cl (300) | −65 | 1.5×10⁵ | 4 | 82 |
| 70 | X=Br; $R^1, R^2, R^3$=H; $R^4$=CH₃COO— | Isobutene (2.0) | CH₂Cl₂ (500) | −25 | 1.5×10⁵ | 2 | 80 | a Physical data of: 5-isocyanato-6-bromo-cyclooctene, cis/trans mixture, boiling point: 87–88° C.; $n_D^{20}$: 1.5308. Analytical values and determination of molecular weight correspond to $C_9H_{12}BrNO$.

The isocyanate formed was distilled in vacuo. 69.5 g (78 percent of the theory) of pure (β-bromo-isobutyl)-isocyanate (threo-erythro mixture) were obtained.

EXAMPLE 49

0.1 Mol of crude N-bromo-3,4-dimethyl-azetidinone-(2) and 33.5 g (0.6 mol) of isobutylene were mixed at −69° C and the mixture was cooled to −193° C by means of liquid nitrogen. This cooled mixture was irradiated for 6 hours at a dose rate of 2.2 × $10^5$ rad/h in the manner disclosed in Example 46. Subsequently, the isobutylene was evaporated at −55° to −60° C within 6 minutes at greatly reduced pressure. The solid residue was then dissolved in methylene chloride at −25° C and an infrared spectrum of the solution was taken. With the aid of the infrared spectrum an isocyanate proportion of from 5 to 8 percent could be evaluated in the irradiated substance by means of comparative mixtures.

The following examples 50 to 70 are compiled in the Table. The reaction mixtures were worked up in the manner disclosed hereinbefore by fractionated distillation in vacuo. In examples 52, 53, 55, 60 and 66 the low-boiling proportions of the reaction mixture were evaporated under greatly reduced pressure at a temperature below −5° C.

We claim:

1. A process for the preparation of a compound of the formula

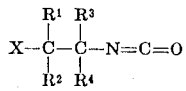

in which X is bromine or chlorine, $R^1$ and $R^2$ are hydrogen, chlorine or lower alkyl, $R^3$ is hydrogen or lower alkyl and $R^4$ is hydrogen, alkyl, haloalkyl or alkenyl of each one to 22 carbon atoms or cycloalkyl of four to eight carbon atoms, an aromatic radical of the benzene series, lower acyloxy, lower carbo-alkoxy, or — if one or both of the radicals $R^1$ and $R^2$ stand for chlorine — lower alkoxy, or each two of the radicals $R^1$, $R^2$, $R^3$ and $R^4$ together form a cycloaliphatic ring or ring system of each 4 to 10 ring members, which comprises contacting a compound of the formula

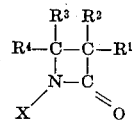

in which X, $R^1$, $R^2$, $R^3$ and $R^4$ are as defined above, with a member selected from the group consisting of an olefin or an acetylene at a temperature of about −200° C to about +250° C in the absence of a compound being capable of forming thermally free radicals in this temperature range.

2. The process as claimed in claim 1, wherein X is bromine.

3. The process as claimed in claim 1, wherein $R^4$ is hydrogen, alkyl, haloalkyl or alkenyl of each up to 10 carbon atoms, or cyclyalkyl of five to eight carbon atoms, phenyl, acyloxy of a lower alkane carboxylic acid, lower carboalkoxy or — if one or both of the radicals $R^1$ and $R^2$ stand for chlorine — lower alkoxy.

4. The process as claimed in claim 1, wherein two of the radicals $R^1$, $R^2$, $R^3$ and $R^4$ together are alkylene of three to six carbon atoms or a bivalent cycloalkyl or cycloalkenyl hydrocarbon radical of each 5 to 8 carbon atoms.

5. The process as claimed in claim 1, wherein the olefin or acetylene is an alkene, alkadiene, haloalkene, alkenylester, alkenylether, cycloalkene or an unsaturated phenyl aliphatic hydrocarbon of up to eight carbon atoms each.

6. The process as claimed in claim 1, wherein the olefin or acetylene is an alkene, alkadiene, alkyne, cyclo-alkene, vinylbenzene, ethinylbenzene, haloalkene, vinylester or vinyl ether boiling under normal pressure below 150° C.

7. The process as claimed in claim 1, wherein a solvent being inert towards the isocyanate group is used.

8. The process as claimed in claim 1, wherein an aprotic solvent is used.

9. The process as claimed in claim 1, wherein a lower haloalkane is used as solvent.

10. The process as claimed in claim 1, wherein a pure enantiomer of an asymmetric N-halogeno-β-lactam, in which at least $R^3$ and $R^4$ are different, is rearranged to an optically active β-halogenoalkyl isocyanate.

11. The process as claimed in claim 1, wherein about 0.6 to about 8 parts by weight, referred to N-halogeno-β-lactam, of an olefin or an acetylene boiling between about 30 and about 100° C is heated with the N-halogeno-β-lactam for about 0.3 to about 3 hours to a temperature of about 30° to about 100° C.

12. The process as claimed in claim 1, wherein the reaction is performed under irradiation with light of a wavelength below about 700 nm.

13. The process as claimed in claim 1, wherein the reaction is performed under irradiation with rays rich in energy of a radioactive radiator.

14. The process as claim in claim 1, wherein the reaction is performed under irradiation with gamma rays.

* * * * *